United States Patent
Hildebrand et al.

(10) Patent No.: US 10,525,550 B2
(45) Date of Patent: Jan. 7, 2020

(54) MACHINE TOOL, MEASUREMENT APPARATUS, METHOD FOR GENERATING WORKING DATA, CLADDING METHOD, METHOD FOR SETTING TEMPERATURE OF A WORKPIECE

(71) Applicant: SAUER GMBH LASERTEC, Kempten (DE)

(72) Inventors: Peter Hildebrand, Pfronten (DE); Martin Reisacher, Kempten (DE)

(73) Assignee: SAUER GMBH LASERTEC, Kempten (DE)

( * ) Notice: Subject to any disclaimer, the term of this patent is extended or adjusted under 35 U.S.C. 154(b) by 590 days.

(21) Appl. No.: 15/100,178

(22) PCT Filed: Nov. 28, 2014

(86) PCT No.: PCT/EP2014/075951
§ 371 (c)(1),
(2) Date: May 27, 2016

(87) PCT Pub. No.: WO2015/079025
PCT Pub. Date: Jun. 4, 2015

(65) Prior Publication Data
US 2017/0001258 A1    Jan. 5, 2017

(30) Foreign Application Priority Data
Nov. 29, 2013    (DE) .......................... 10 2013 224 649

(51) Int. Cl.
*G06F 19/00*    (2018.01)
*B23K 26/00*    (2014.01)
(Continued)

(52) U.S. Cl.
CPC ........ *B23K 26/0093* (2013.01); *B23K 26/034* (2013.01); *B23K 26/0884* (2013.01);
(Continued)

(58) Field of Classification Search
CPC ................................................... B23K 26/032
(Continued)

(56) References Cited

U.S. PATENT DOCUMENTS 4,255,643 A * 3/1981 Balfanz ............... B23K 9/1274
219/124.34
5,379,237 A * 1/1995 Morgan ................. B21B 37/78
378/59

(Continued)

FOREIGN PATENT DOCUMENTS

DE    41 20 790 A1    1/1993
DE    10 2004 018 699 A1    11/2005
(Continued)

OTHER PUBLICATIONS

Office Action dated Jan. 2, 2018, issued in counterpart Korean Application No. 10-2016-7016668, with English translation. (19 pages).
(Continued)

*Primary Examiner* — Suresh Suryawanshi
(74) *Attorney, Agent, or Firm* — Westerman, Hattori, Daniels & Adrian, LLP (57) ABSTRACT

The invention relates to a machine tool (10) comprising a machine controller (19), a machine frame (11), a work table (13), a tool holder (14), preferably of a standardized design, multiple translational and/or rotational axes (12a, 12b) for adjusting the relative position of the work table (13) and the work holder (14), a tool magazine (16) for one or more material-removing, in particular machining tools (15), a tool-change mechanism for automatically transporting tools between the tool holder (14) and the tool magazine (16), a deposit-welding head (20) that can be inserted into the tool holder (14) and a storage device (25) for storing the deposit-welding head outside the tool holder (14).

12 Claims, 3 Drawing Sheets

(51) Int. Cl.
  *B23K 26/08*    (2014.01)
  *B23K 26/14*    (2014.01)
  *B23Q 3/155*    (2006.01)
  *B23K 26/70*    (2014.01)
  *B23K 26/03*    (2006.01)
  *B23K 26/34*    (2014.01)
  *B23Q 17/22*    (2006.01)
  *G05B 19/042*   (2006.01)
  *G05B 19/29*    (2006.01)

(52) U.S. Cl.
  CPC .......... *B23K 26/1482* (2013.01); *B23K 26/34* (2013.01); *B23K 26/706* (2015.10); *B23Q 3/15513* (2013.01); *B23Q 17/22* (2013.01); *G05B 19/0428* (2013.01); *G05B 19/29* (2013.01); *G05B 2219/37211* (2013.01); *G05B 2219/45138* (2013.01)

(58) Field of Classification Search
  USPC .......................................................... 700/166
  See application file for complete search history.

(56) References Cited

U.S. PATENT DOCUMENTS

| | | | | |
|---|---|---|---|---|
| 6,232,572 | B1 * | 5/2001 | Kanjo | B23K 11/115 219/110 |
| 6,605,795 | B1 | 8/2003 | Arcella et al. | |
| 7,020,539 | B1 | 3/2006 | Kovacevic et al. | |
| 2012/0012559 | A1 * | 1/2012 | Fisher | B23K 9/0953 219/73.2 |
| 2014/0238964 | A1 * | 8/2014 | Casner | B23K 9/1087 219/132 |
| 2015/0083710 | A1 * | 3/2015 | Albrecht | B23K 26/60 219/601 |

FOREIGN PATENT DOCUMENTS

| | | |
|---|---|---|
| DE | 10 2010 004 193 A1 | 7/2011 |
| DE | 102012221218 A1 | 5/2013 |
| EP | 1 859 893 A1 | 11/2007 |
| JP | H10-291070 A | 11/1998 |
| JP | 2003-266174 A | 9/2003 |
| JP | 2004-82556 A | 3/2004 |
| JP | 2004-306612 A | 11/2004 |
| JP | 2009-113048 A | 5/2009 |
| JP | 2012-86235 A | 5/2012 |
| JP | 2013-63488 A | 4/2013 |
| WO | 2012/029843 A1 | 3/2012 |

OTHER PUBLICATIONS

Search Report dated Dec. 18, 2017, issued in counterpart European Application No. 17171333.2.
Partial Search Report dated Sep. 7, 2017, issued in counterpart European Application No. 17171333.2.
Nowotney, et al., "Laser-Einheit Mach Auftragschweißen auf Bearbeitungszentrum Möglich", MM Das IndustrieMagazin, 17/2009, pp. 42-44. (Relevance discussed at p. 2 of present application).
International Preliminary Report on Patentability (Forms PCT/IB/326) of International Application No. PCT/EP2014/075951 dated Jun. 17, 2016, with Forms PCT/IB/373, PCT/ISA/237 and PCT/IB/338. (17 pages).
Office Action dated Aug. 8, 2017, issued in counterpart Japanese Application No. 2016-534633, with English machine translation. (9 pages).
Schulz, "Gute Kombi: Laser und Fraser", FORM + Werkzeug, Nov. 15, 2013, 6, pp. 42-43, ISSN 1439-667X. Cited in Result of Earlier Search.
"Universell bedeutet unabhängig", In: FORM+Werkzeug, 2012, 1, pp. 18-21, ISSN 1439-667X. Cited in Result of an Earlier Search.
International Search Report dated Jun. 8, 2015, issued in counterpart International Application No. PCT/EP2014/075951 (2 pages).
Result of an Earlier Search dated May 22, 2014, issued in counterpart German Application No. 10 2013 224 649.8 (6 pages).
"Laser—Einheit Macht AuftragsschweiBen auf Bearbeitungszentrum Moglich," by Nowotney, et al., MM Das Industriemagazin, Dec. 2009, p. 42, ff. (relevance discussed at p. 2 of current application).

* cited by examiner

MACHINE TOOL, MEASUREMENT APPARATUS, METHOD FOR GENERATING WORKING DATA, CLADDING METHOD, METHOD FOR SETTING TEMPERATURE OF A WORKPIECE

The invention relates to a machine tool, a measurement apparatus, an apparatus for temperature setting of a workpiece, a method for generating work data, and a cladding method.

So far, cladding welding is used as a constructive working method, predominantly for coating items with a desired cover or for repair welding close to a final contour. The following aspects are particularly problematic for the complete manufacturing of workpieces by means of laser cladding:

Cladding welding per se is a constructive method with relatively low preciseness. Imprecision of the mere cladding welding step per se leads to tolerances of 1 mm or more.

Besides that, cladding welding is a "hot" procedure. The material to be welded is liquid and usually has a temperature above 1500° C. When coating or making local repairs, material is applied onto relatively large heat sinks, so that the applied material quickly cools down. When, in contrast, a complete workpiece is to be manufactured, there are no cold heat sinks near the welded material. Only workpiece portions welded earlier themselves are nearby which themselves are still warm. Then, the applied material cools down relatively quickly (iron/steel) below red heat (below 500° C.), but still relatively high workpiece temperatures will occur. They may be between 100 and 200° C. or above. The heat expansion coefficient of iron is $10^{-5}/°$ C. A temperature change of 300° C. between manufacturing temperature (for example above 300° C.) of a workpiece and temperature of use (for example room temperature) leads to a dimensional change of $3 \times 10^{-3}$ or 3‰. When the overall dimension of a workpiece is, for example, 100 mm, the temperature change of the dimension is 300 µm. In many fields such quantities are inacceptable.

U.S. Pat. No. 7,020,539 B1 describes a system and a method for manufacturing or repairing a part. The system comprises a cladding station serving for applying consecutive two-dimensional material layers for forming the three-dimensional part. It also comprises a work station for removing at least a part of one or more of the applied two-dimensional layers. Applying material may be made by means of laser cladding welding (laser cladding). A multi-axes robot may be provided for applying material. The work station comprises a multi-axes working machine and an automatic tool changer.

The article "Laser-Einheit macht Auftragsschweißen auf Bearbeitungszentrum möglich" by Nowotny et al. in "MM Das Industriemagazin", 17/2009, page 42 ff., describes a laser working optics insertable into the spindle of a CNC-machine via a cone coupling. Welding material is supplied to the laser burning point via a powder nozzle. In the same machine, the workpiece can be milled.

It is the object of the invention to provide a machine tool, a cladding welding method, and components thereof allowing a precise manufacturing of workpieces by means of laser cladding.

This object is accomplished by the features of the independent patent claims. Dependent claims are directed on preferred embodiments of the invention.

A machine tool comprises a machine controller, a machine frame, a workpiece table, a tool holder, preferably formed in accordance with a standard (SK, HSK), which may be the drive end of a spindle, plural translatory and/or rotatory axes for adjusting a relative position between workpiece table and tool holder, a tool magazine for one or more material ablating tools, particularly chipping tools, a tool changing mechanism for automatically transporting tools between tool holder and tool magazine, which may comprise an automatically operating arm for transporting the tool between tool holder and tool magazine, a cladding welding head (cladding head) insertable into the tool holder and a holding device for holding the cladding head apart from the tool holder, wherein the holding device may be provided apart from the tool magazine.

The automatic change between cladding welding (cladding) and material ablation leads to a quick work progress that is well predictable, so that also thermal situations and effects are better predictable and can be anticipated in manufacturing planning.

The holding device may comprise a transport device for translational and/or rotational transporting the held cladding head between a park position and a change position that is accessible by the tool holder for picking up or giving back the cladding head.

The cladding head is considered to be a separate part of the invention and comprises a welding means preferably based on a laser beam, a welding material supply for supplying welding material (metal, ceramic, . . . ) to the cladding welding spot, wherein the supply may be the supply of a wire or of material particles by a fluid flow, an inert gas supply, a flexible trailing cable installation for supplying laser light and/or welding material and/or inert gas and/or electric power and/or electric signals. Further, a temperature sensor with spatial resolution may be provided.

A measurement apparatus particularly used in a cladding welding method for measuring a workpiece in a cladding welding machine is considered a separate part of the invention. It may be implemented as a unit or by distributed components. It may fully or in part be a unit with a laser cladding head or may be separate therefrom.

The measurement apparatus comprises a position measuring means for determining position data, preferably in three dimensions, of surface points of a machined workpiece, a temperature measurement means for determining temperature data relating to the temperature at a surface point shortly before or after measuring the point by means of the position measuring means, and a storage means for storing position and temperature data of plural surface points in an allocatable manner. The storage means may further store time data relating to measurement times of surface points in an allocatable manner.

An apparatus for setting a workpiece temperature for a workpiece to be manufactured in a computer-controlled machine tool comprises a mounting portion for mounting the apparatus on a workpiece table of the machine tool, a workpiece base portion which is or accommodates a workpiece basis, a controllable heater (feedback or not) provided between mounting portion and workpiece base portion for heating the workpiece base portion, and a thermal insulation between heater and mounting portion.

A method for generating work data for a cladding welding machine for manufacturing a workpiece starting from stored workpiece data and other data is characterized in that for generating the work data for the machine, in accordance with the workpiece data, process-characteristic data and other parameters, manufacturing dynamics data are determined that reflect the temporal course of manufacturing; temperature-related data are determined in accordance with workpiece data, the characteristics and the manufacturing dynamics data that describe temperature effects on workpiece portions, and the work data are generated also in accordance with the temperature-related data.

A cladding welding method comprises the steps of generating work data for the cladding welding; controlling the machine in accordance with the work data; during manufacturing, measuring temperatures and workpiece surface positions in spatial resolution; checking the measurement values; and, in accordance with the checking results, modifying one or more of the following work parameters: feed rate relative between cladding head and workpiece, welding heat power, material supply rate, material supply speed, laser focusing.

In the following, embodiments of the invention are described with reference to the drawings, in which.

Figure 1:
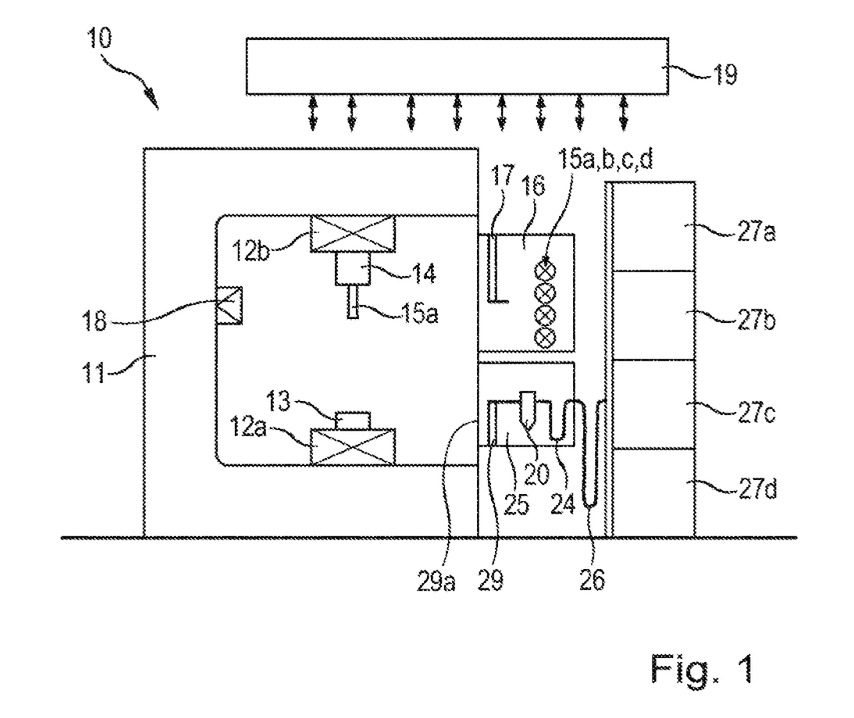
FIG. 1 is a schematic machine tool.

FIG. 1 shows a machine tool in accordance with the invention. It generally comprises a machine controller 19 that may be connected to a not shown storage apparatus. The machine controller may be a single computer or may be a suitably connected cluster of plural computers and/or other (digital) components. They may be close to the machine or elsewhere and may be connected through suitable installations (wire, wireless). The machine controller 19 controls the essential functionalities of the machine and may receive data from sensors 18 in the machine and may output control signals for operating the machine.

The machine controller 19 may operate in accordance with work data generated for controlling the machine for machining a particular workpiece. The work data may be an executable program or non-executable data referenced by a program running in the controller.

The machine comprises a machine frame 11 at which, via interposed control axes 12a, 12b, the workpiece table 13 and the tool holder 14 are mounted. The axes 12a, 12b may comprise plural translatory (x, y, z) or rotatory (φ, λ, θ) axes adjustable in accordance with the machine controller 19. The design may be such that the tool holder 14 is attached to the machine frame through two or three translatory axes, while the workpiece table 13 is attached to the machine frame via one, two or three rotatory axes. Machine tools usually comprise a (not shown) closed cabin that suppresses chip contamination of the surroundings.

The tool holder 14 is preferably formed in accordance with a standard, particularly in accordance with SK or HSK. It may be the driven end of a spindle. The spindle may drive a tool 15 insertable into the tool holder into turning rotatory motion. The system layout may be such that speeds of 10.000 rpm or more are used. The tool 15 inserted into the tool holder 14 may be a conventional ablating tool (grinder, mill/milling cutter, drill, chisel), or may be a special machining tool (laser ablation, ultrasonic tool or the like).

Plural different tools 15a, 15b, c, d, . . . may be held in a tool magazine 16. An automatic tool changing mechanism under the control of the controller 19 is provided for taking tools 15 from the magazine 16 and supplying them towards spindle/tool holder 14 and vice versa. The tool changing mechanism usually comprises a separate tool changer 17 which transports tools between a suitably positioned tool holder 14 of the machine and a stock position in the magazine 16. However, in a simple embodiment, the mechanism may be only a suitable driving scheme of the tool holder 14 such that it approaches an accessible tool at a known position for picking it up there or giving it back there.

Further, the machine comprises a cladding welding head 20. It is also insertable into the tool holder 14 or withdrawable therefrom. These steps are automatically executable under the control of the machine controller 19. A holding means 25 is provided for holding the cladding head 20, when not in use, apart from the tool holder 14. The holding means may be provided separately from the tool magazine 16.

For the cladding head 20, too, automatic pick-up and give-back is provided. And likewise, a separate change arm may be used for transporting it between holding means 25 and a position accessible to the tool holder 14. In another embodiment, it is possible to provide a transport means 29 that transports the holder of the holding means 25 between a change position and a park position. The change position is at a position accessible to the tool holder 14, while the park position is at a retracted position. The transport means may comprise an arm at the tip of which the holder of the cladding welding head is located and which is translational and/or rotational moved between the mentioned positions. It is also under the control of the machine controller 19.

A movable shielding 29a may be provided, which is formed, e.g., as an openable and closable door for shielding the cladding head 20 held in the holding means 25 from process impact. Chipping workpiece machining will certainly lead to chips in the machine cabin. Besides, cooling fluids may be supplied that make an ablating process very "dirty", so that shielding of the not needed tools, particularly of the cladding head, is advisable.

The cladding head usually comprises a trailing cable installation 24 for conveying required media and electric power and signals. The trailing cable installation 24, 26 may comprise a light conductor for supplying externally generated laser light as a power supply for reaching welding temperature, a material supply duct for supplying the material to be welded, wherein this duct may be a fluid conveyance duct through which material powder (metal, iron, steel, ceramic, . . . ) is supplied by a suitable fluid, such as inert gas, in suitable rates/quantities/speeds, to the work site, an inert gas duct for separately supplying inert gas for protecting the process against environmental impacts, chips and the like, electrical wires for power for consumers in the cladding head, signal wires for control signals for controllable components in the cladding head, signal wires for signals from components in the cladding head, such as sensors 23 or other signal generating components.

The given ducts may be bundled into a common trailing cable installation (internal 24, external 26) of sufficient length and guided together with the cladding head 20. Instead of as a fluid-supplied powder the welding material may also be supplied as a wire.

For cladding welding, sensors 23 may be provided, which may form the above-mentioned measurement apparatus fully or in part. The measurement apparatus/sensors 23 may be mounted to the cladding head 20 or may fully or in part be separate therefrom. The sensors may be suited for temperature measurement under spatial resolution. The spatial resolution may be selected such that the temperature of the melted welding material and of adjacent workpiece portions can be determined separately and reliably. The spatial resolution may be in the range of millimeters and may be better than 2 mm or better than 1 mm or better than 500 µm. It may be coarser than 10 µm or coarser than 20 µm. The temperature sensors may comprise a pixeled thermographic camera that continuously generates signals and finally supplies them towards the controller 19, for example through the trailing cable installation 24.

The sensor equipment may also comprise position sensing equipment and geometry sensing equipment which measures, in real time and preferably in three dimensions, parts of the manufactured workpiece and supplies these data, possibly through the trailing cable installation 24, towards the controller 19. In an embodiment, the temperature sensing equipment may be attached to the cladding welding head 20, while surface/geometry/position sensing equipment may be separate therefrom, and may, e.g., fixedly be mounted in the machine cabin. It may comprise one or more laser line sensors or area sensors.

A storage device is seen as a part of the measurement device/sensor equipment 23. It stores correlated measured data (temperature, location, time) in an allocatable manner, so that they can be used later. Particularly, temperature data and geometry data of same locations shall be stored in a mutually allocatable manner. Likewise, time data indicating the measurement time may be stored in an allocatable manner. In this way a meaningful manufacturing journal is established that may separately be evaluated. It is pointed out that at the same workpiece location the temperature may be measured plural times, e.g. for a first time immediately during manufacture when it is still melted, and one or plural times later as a location distant from the instantaneous manufacturing location, then usually exhibiting lower temperatures. All these data may be stored in a mutually allocatable manner.

This storing may be performed in certain formats, such as XML-tagged, or at least in a particular environment or allocatable in a certain software.

Insofar, also a method for generating a manufacturing journal as described above is seen as an own and individually claimable part of the invention.

Figure 2:
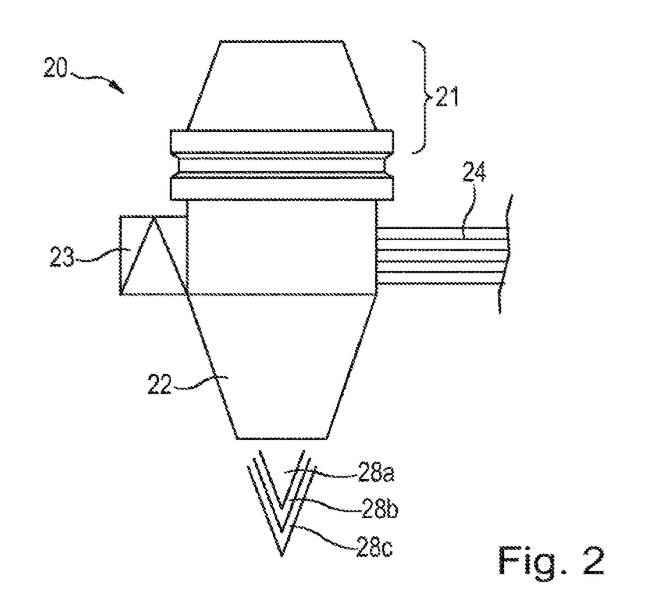
FIG. 2 is a schematic cladding head.

FIG. 2 schematically shows a cladding welding head. 21 is a coupling towards the tool holder 14 of the machine 10. Preferably, it is formed in accordance with a standard, such as HSK or SK, and is shaped so as to be complementary to the tool holder 14. 24 symbolizes the above-mentioned trailing cable installation. 22 is the cladding head body, inside of which the required components are mounted, such as laser light guidance and focusing means, control and guidance means of the various media, actors, further sensors, etc.

28 indicates various artefacts through which the cladding head 20 acts upon the workpiece. 28a symbolizes a focused laser beam usually focused towards the instantaneous workpiece surface, or having an intentional defocusing relative thereto. For protecting the optical components in the head, the laser light cone 28a is surrounded by an inert gas cone 28b generated by a nozzle. Still further outwards, the welding material supply is symbolized by 28c. When powder welding is used, the material (metal, iron, ceramic, or the like) is supplied in granular form or as a powder in a fluid flow, the fluid usually being a gas or an inert gas (argon, nitrogen or the like). Without a fluid, the welding material may also be supplied as a wire.

Through the machine axes 12a and 12b the cladding head 20 is guided across the workpiece surface as desired and, in this way, applies material. The material may be iron or an iron alloy, particularly steel. However, it may also be ceramic or another material.

27 are supply components for the cladding welding head. They comprise a laser source 27a, a welding material source 27b, an inert gas source 27c, and possibly also electronic (digital) components 27d for operating the cladding head. They are shown separately aside the machine. However, likewise, they may, fully or in parts, be integrated into the machine and are not separately recognizable. They are connected with the machine 10 through an external trailing cable installation 26. The operation of the cladding head 20 and of its electronic components 27d may be under the control of the general machine controller 19.

Figure 5:
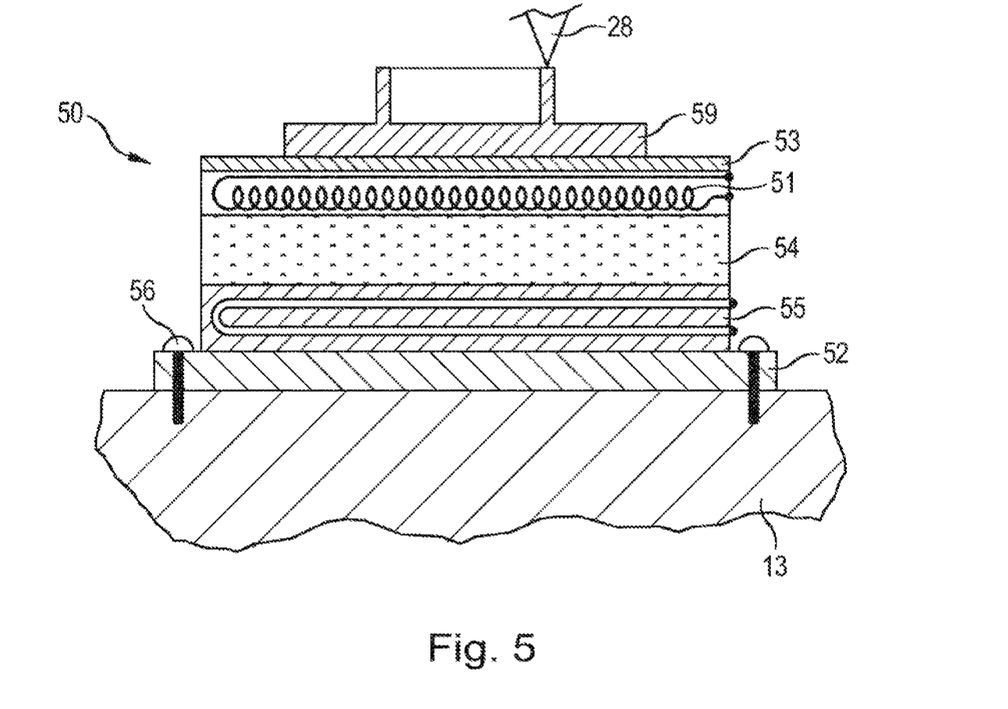
FIG. 5 shows a workpiece temperature setting device.

FIG. 5 shows a further hardware component. It is a workpiece temperature setting apparatus 50. It serves for maintaining the workpiece temperatures rather high, so that at least during workpiece manufacturing by cladding welding the temperature gradients away from the instantaneous work site are smaller so that the conditions are better predictable or simulatable.

The apparatus 50 is inserted between workpiece table 13 and workpiece basis 59. It comprises a mounting section 52 through which the apparatus can be mounted at the workpiece table 13, e.g. with screws or claws 56. It further comprises a heating 51. It may operate electrically or with a fluid. The heater may be controllable or feed-back controllable. What is not shown are temperature sensors for measuring the temperature and their wiring, which may also be provided.

The workpiece base portion 53 of the temperature setting apparatus 50 is provided between the heater and the actual workpiece. It is suited for mounting the workpiece basis 59 in a suitable manner thereto. It may, e.g., be shaped just as a workpiece table. Both, the mounting portion 52 and the workpiece base portion 53, may comprise flat surfaces and may be made by more or less massive metal plates, or may comprise such plates. The heater 51 heats the workpiece base portion 53 and, thus, also indirectly the workpiece basis 59. Through this, the workpiece is kept uniformly at a certain temperature.

Further, an insulating layer 54 may be provided for thermally insulating the heater against the workpiece table 13 and, thus, against the machine. According to necessity and power, also a cooling means 55 may be provided between insulation 54 and mounting portion 52. It may also comprise not shown sensors with wiring. It may be a fluid cooling system, such as water cooling, including corresponding connectors.

What is not shown are the respective terminals for media/fluids/signals/power. However, they are, of course, provided, possibly as trailing cable installation away from the temperature setting apparatus 50 towards a not shown supply device. As far as the workpiece table 13 is made for continuous rotation or is intended to be used in this manner, trailing cable installations can usually not be used. Then, instead of a trailing cable installation, passages of the ducts and wirings through the machine axes may be provided.

The heater may be adapted for heating the workpiece base portion or the workpiece basis 59 to temperatures of above 100° C. or above 150° C. or above 200° C. or above 250° C. An upper limit may be 400° C. or 350° C. or 300° C.

Most workpiece portions will be hot, but will have a temperature below red heat (for iron/steel below 500° C.) and, thus, usually below 400° C. Then, when the temperature setting apparatus 50 adjusts a temperature of, e.g., 250° C., the temperature gradient along the workpiece is decreased, so that the thermal situations are foreseeable and are easier to be computed and thus, easier to be anticipated when the work data are generated.

Figure 3:
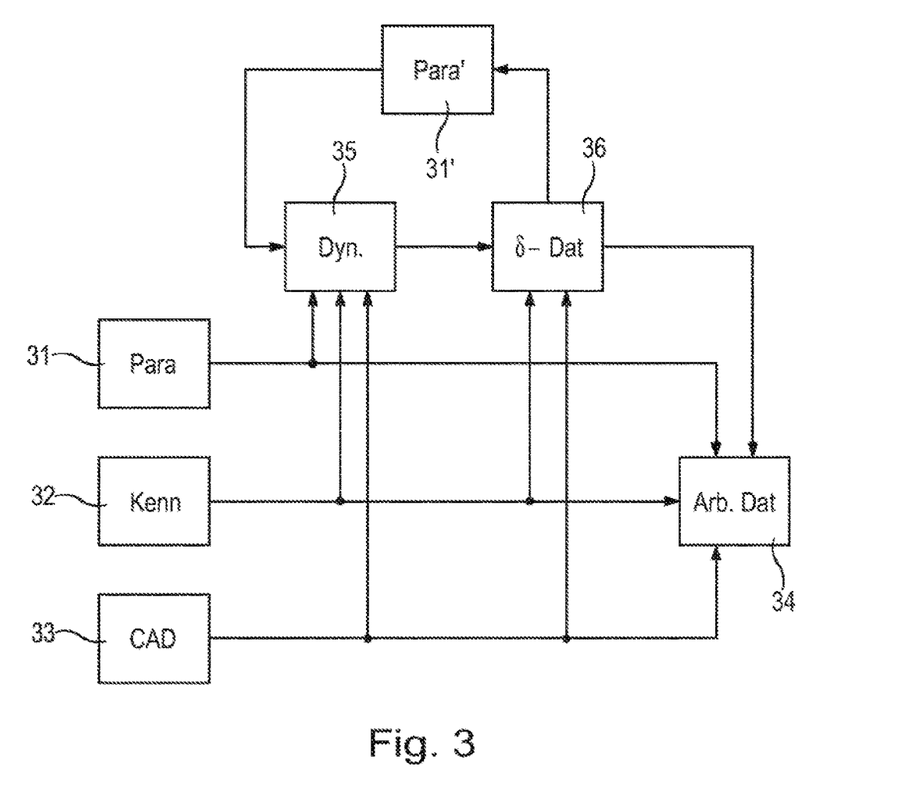
FIG. 3 is a schematic method for generating data for the cladding welding.

Referring to FIG. 3, a method for generating work data for the machine tool is described. The work data are those data that are supplied to a machine tool and, in accordance to which, the machine performs the manufacturing of the workpiece. The data may be an executable program or may be data read by another program for executing the respective activities. Generally speaking, the work data may relate to the control of all actuators, i.e. control of the axes, control of the cladding welding parameters, control of tool handling, control of the temperature setting apparatus, and many more. The work data may also control the reading of sensor equipment and the processing of sensor equipment data.

Since, as explained above, cladding welding is complex in that for a precise manufacturing of workpieces large temperature changes must be considered, it is not sufficient for cladding welding to determine work data 34 for a machine tool as usually from workpiece data 33, characteristic process values 32, and selectable parameters 31. Rather, temperature effects must be considered.

The workpiece data 33 may be CAD data which are obtained from usual CAD programs and which describe a workpiece by vectors, or similarly to a bit-map, e.g. by voxels, for the purpose of manufacturing.

The characteristic values 32 are generally characteristic values of the cladding welding process. They are basic data regarding required temperatures, required material flows, possible speeds, required welding power, power, speed, and the like.

The data 31 symbolize selectable parameters which can be set. For example, when a degree of freedom is given to select between manufacturing speed and manufacturing quality, related indications may be made here. In usual systems, work data 34 are generated from these data, and workpiece machining is then made in accordance therewith.

However, besides the above, from the mentioned parameter data 31, process characteristic values 32 and workpiece data 33 also manufacturing dynamics data 35 are determined. These data reflect the development of the workpiece along the time axis, particularly manufacturing points of time of particular workpiece portions. Since temperature conditions strongly depend on time due to thermal balancing over time, it is important to know how workpiece buildup occurs over time.

It is pointed out that heating power in the system may be considerable. A welding laser typically has some 100 W to kW of power and the temperature setting apparatus may introduce power in the same range. These powers are converted into heat. In the relatively small machine cabin (for example volume of 1 $m^3$), heating power may be 5 kW. Thus, the temperature effects are significant.

Assuming for the moment that by cladding welding an upwardly opening funnel is to be manufactured, this may be made by guiding the cladding welding head along a spiral with increasing radius relative to the instantaneous funnel rim of the already existing workpiece. The manufacturing dynamics data then indicate at which times certain workpiece portions or workpiece spots had been manufactured.

If possible, the manufacturing dynamics data 35 as described above may also be determined differently than when one starts from the shown input data 31, 32 and 33. These input data may, for example, be only used partially, for example only the workpiece data 33, for accessing entries in a library, or the like, for generating the manufacturing dynamics data 35 in this manner.

The manufacturing dynamics data 35 may then be used together with further data for determining temperature-related data 36. Here, thermal simulations may be made (finite elements methods, voxels, . . . ), which consider heat conductivity, continuously the energy input by the continued welding and, potentially, also by the temperature setting apparatus, heat dissipation by heat conduction and radiation, and the like. These simulations may be complex, elaborate, and may require computational power. In this manner, temperature-related data 36 are generated, which give, on the one hand, direct information on temperatures of workpiece spots or workpiece portions, which may then be used for further evaluations, e.g. for determining local heat expansion (or of the entire workpiece), temperature gradients, and the like.

The temperature-related data 36 may be given in spatial resolution such that for different workpiece portions different quantities are given. The spatial resolution may be in a range of better than 10 mm or better than 5 mm or better than 2 mm or better than 1 mm. Particularly, the temperature-related data 36 indicate how the relatively high temperatures globally and locally affect the workpiece measurements during manufacturing. Usually, the high temperatures lead to the effect that the workpiece is larger during manufacturing than it is afterwards when temperatures are equalized.

Referring to the temperature-related data 36 this can be anticipated when the work data 34 are generated, particularly such that the workpiece is systematically manufactured "too large", what may lead, after cooling and temperature equalization, to a correct dimension.

Different from what is shown, the temperature-related data 36 need not be computed only when the manufacturing dynamics data 35 have been completely computed. Rather, they may be determined more or less simultaneously and may develop as a set of data simultaneously.

If possible, the temperature-related data 36 as described above may be determined in a way different from that of starting from the shown input data (31, 32, 33, 35). The input data may, for example, only partially be used, e.g. only the workpiece data 33, for accessing entries in a library or the like, for generating temperature-related data 36 in this manner.

Figure 4A:
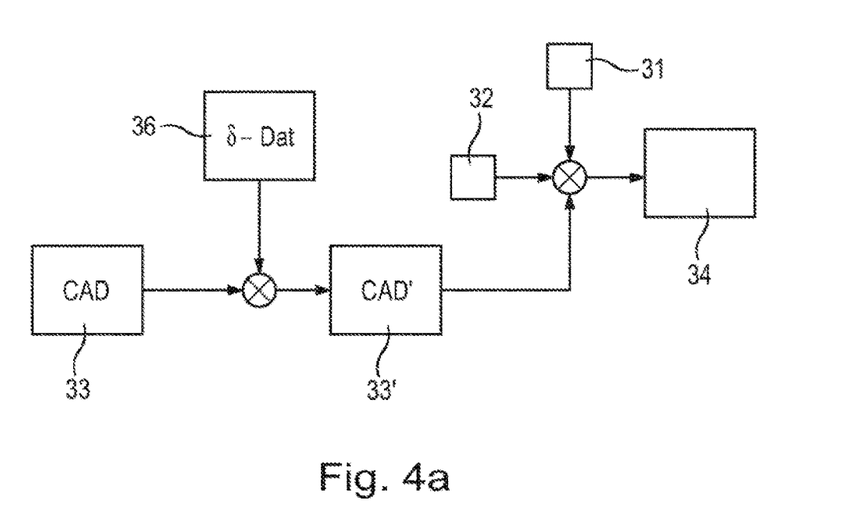
FIG. 4 shows schematic options to FIG. 3.

As shown in FIG. 4a, it is possible to use the temperature-related data 36 to recompute the workpiece data 33 (target data) onto temperatures prevailing during manufacturing. In this manner, a larger "target" is determined corresponding to thermal expansion. In FIG. 4a, this is indicated by 33'. This larger target 33' is then used together with the other data for generating the work data 34.

Figure 4B:
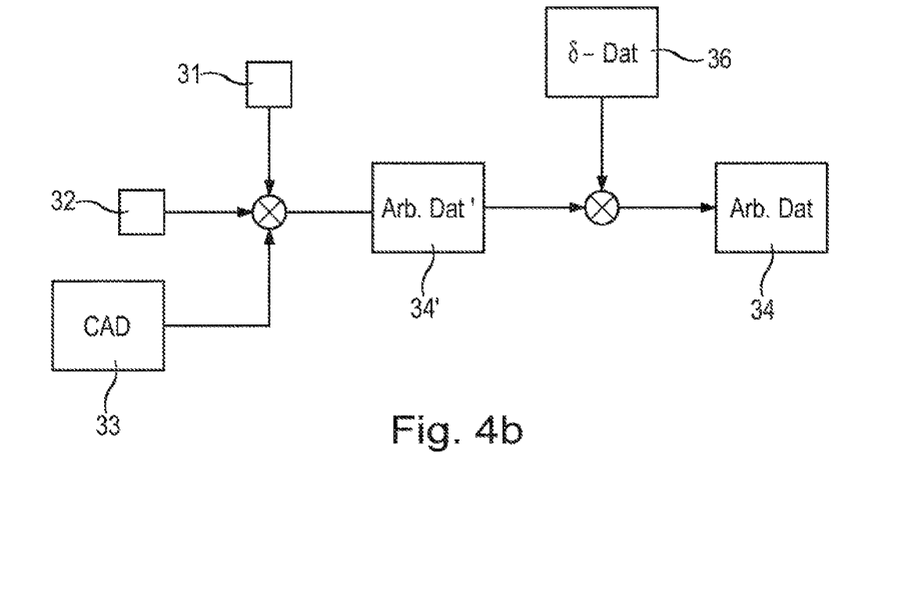

Another possibility of using the temperature-related data 36 is schematically shown in FIG. 4b. Here, the already determined work data 34' are seen as preliminary data and are recomputed according to the temperature data 36 onto the actually prevailing temperatures. Usually, this may also lead to an enlargement of the overall dimensions corresponding to the thermal expansion during manufacturing.

In a further embodiment, recursions may be made in relation to the temperature conditions, when the work data are generated. Assuming that, in a first run, temperature-related data 36 were determined, these data (such as local temperatures, local gradients) may be checked with reference to limit values or target values. It may, for example, be checked whether overheatings occur, recognizable from high or too high temperatures. This may happen, for example, at small workpieces or at minute workpiece portions, where welding laser power is lengthily introduced into a limited region. If threshold exceedances are found, modified parameters may be generated, for example, a higher feed rate or reduced laser power which may, in turn, lead to changed dynamics data (not shown in FIG. 3), which, in turn, may lead to changed temperature-related data.

Referring to the temperature-related data 36 or to the result of checking these data, also direct changes in the work data 34 may be made, for example such that the machining process jumps from a work site at the workpiece that tends to overheat, if possible, to another site for continuing there, so that the earlier site can cool down before manufacturing is continued there.

In this manner, the manufacturing plan as given by the work data 34 can be optimized such that the difficulties resulting from the complex thermal situations are reduced. In this manner, work data 34 are generated which readily anticipate the thermal effects from the cladding welding at the workpiece to be manufactured and avoid overheatings, so that finally a precise workpiece can be manufactured.

The method described so far assumes an undisturbed course of workpiece manufacturing ("planned course"). However, the work data 34 generated in this way are no longer correct when the course of manufacturing is unplanned, for example, because system errors occur, e.g. when the material supply is interrupted, leading to half an hour standstill. Meanwhile, temperature equalization occurs, which leads to the fact that thermal situations are different than assumed for the undisturbed course.

For enabling, in such a situation, the high-quality (particularly finally precise) continuation of work by cladding welding, plural sets of temperature-related data may be determined. For example, for two or three or plural (generally: n) workpiece spots interruptions may be assumed which may last, e.g., 2 or 5 or 10 or 20 minutes (generally: m different durations). For these possibilities, plural (n×m) sets of temperature-related data may be determined which may further be developed into plural (n×m) sets of modified work data. These modified data sets are then on hand and can be used, if required. Then, also interpolations regarding space and time may be made. In this manner, it is also possible to continue cladding welding with high quality after disturbances.

In the following, a cladding welding method is described. It is performed in a machine tool 10 by means of a cladding welding head 20. The machine tool is formed as described earlier. Before the commencement of manufacturing, work data 34 are supplied to the machine. These data may be formed as described above. In accordance with these data (work data 34) and other data, the machine and components therein are driven by the controller 19 during workpiece manufacturing. In parallel to the manufacturing, measurements are made by the measurement apparatus/sensing installations 23. Measurements include the measurement of the geometry of the workpiece manufactured so far, particularly by measuring surface points preferably in three dimensions (x, y, z) in desired resolution, and temperature measurements which are also in spatial resolution. The spatial resolution of surface measurements (geometry measurements) may be different from that of temperature measurement. However, the measurements are made in an allocatable manner such that the system knows at which location which temperature prevails.

Both the spatial measurement results and the temperature measurement results may be used for (feedback-)controlling the workpiece manufacturing. They may be used for modifying the manufacturing progress as given by the work data 34. The work data may be given as control target values to be followed in accordance with fed-back sensor information.

A part of the temperature measurement may be the measurement of the temperature of the instantaneous weld pool. It is the aim to keep this temperature in a certain range. When the temperature becomes, e.g., too high, interventions into machine control may be made, for example such that laser power (welding power) is reduced or that the feed rate and/or the material supply at the cladding head 20 is changed such that lower temperatures occur. One may proceed analogously oppositely when too low temperatures of the welding pool occur.

When the spatial measurement data show deviations from target values, one may also interfere. When, for example, the thickness of the deposited layer is too high, laser power and material supply may be reduced, or feed rate may be enhanced, and analogously vice versa.

Generally speaking, in accordance with the measurement results of temperature measurement and/or of geometry or surface measurement of the workpiece manufactured so far, the following system parameters may be controlled: welding heating power, particularly the laser power, material supply rate (mass per time), material supply speed (meters per second), laser focusing, feed rate of the cladding welding head relative to the workpiece, and flow rate of carrier gas and inert gas.

The measurements of allocated geometry data and temperature data may continuously be stored. In this manner, an evaluatable machining journal is build up. Storing is made such that temperature and geometry/surface point data are mutually allocatable. Preferably, also related time data are stored in an allocatable manner. Then, history on geometry, temperature and time of the workpiece manufacturing is available, which may be used for evaluation purposes. The evaluation results may be used to generate modified work data 34, which lead to an optimized workpiece manufacturing. The stored data may also be used for estimating workpiece quality and generating related data.

When unplanned circumstances lead to manufacturing evolving differently than planned, particularly delayedly, this can be found by comparing the actual development over time with an assumed undisturbed development. If a disturbance is found, modified work data may be determined or, as far as available, earlier generated modified work data may be used, as described above.

Generally speaking, the cladding welding method described so far may be used in combination with material removing methods, wherein both methods may be made in the same machine without changing the mounting of the workpiece. Manufacturing precision of cladding welding in accordance with present technology does not reach the manufacturing precision of chipping machining such as milling, drilling, or turning, or special machining, such as laser ablation, ultrasonic machining, or the like. For this reason, it is presently a strategy to manufacture by laser cladding welding a workpiece blank "too large" everywhere, which, thereafter, can be reduced to final measurements by conventional material removing machining. Differently from most conventional machining processes, then, however, when long waiting times after cladding welding are to be avoided, the conventional removal is made in relatively hot environment, for example, at 200° C. or 300° C. Then, also the mentioned temperature effects, particularly relating to thermal expansion or shrinking, are to be considered. Likewise, changed removal characteristics may be given due to the different (higher) temperatures which must be considered.

The alternating approach of cladding welding and material removal may be stored in a single manufacturing program, called—in the sense of this specification—common work data 34, which then alternatingly drive operation of the cladding welding head and of the material removing tool, and between them the tool changing mechanism. In the method indicated in FIG. 3, then, not only the characteristics and settings of the cladding welding must be considered, but likewise those of the material removing method. The steps of material removal to be performed insofar have, of course, also thermal consequences, so that usually the workpiece will cool down. This affects the geometry during machining and must be considered during both, material removal and a possibly subsequent further material deposit by cladding welding. This can be achieved with reference to the already mentioned manufacturing dynamics data 35 and the temperature-related data 36 derived therefrom.

In the following, possible dimensions, values and ranges in relation to the described invention are given:

Total workpiece size: >20 mm, >50 mm or >100 mm, possibly <1000 mm, <500 mm, cladding welding power: >500 W, >1000 W, >2000 W, <20,000 W, <10,000 W, material deposit rate: >0.1 g/min, >0.5 g/min, >2 g/min, <200 g/min, <100 g/min, welding materials: iron, steel, nickel-base alloys, cobalt-chrome, stellites, generally metallic alloys, ceramic, welding temperature at the instantaneous work site: for steel 1,400 to 1,600° C., for ceramic 1,100° C. to 2,500° C., workpiece temperature apart from the instantaneous work site: >50° C., >100° C., >200° C., for metal <500° C., feed rate of the laser welding head relative to the workpiece: >0.1 m/min, >0.2 m/min, >0.5 m/min, <5 m/min, <2 m/min.

Features described in this specification shall be deemed combinable with each other, even if such a combination is not expressly mentioned, as far as the combination is technically possible and useful. The description of method steps is to be understood also as a description of devices implementing these method steps, and vice versa. Further, the description of control methods is also to be understood as the description of software implementing this control method. Insofar, software and data carriers with software thereon are to be understood as an own part of the invention.

The invention claimed is:

1. A method for producing work data for a cladding welding machine, for producing a workpiece, comprising the steps of:
    (a) determining temperature-related data (36) which provide information about the temperature of workpiece parts or workpiece regions in a spacially resolved manner, and
    (b) generating the work data (34) on the basis of the temperature-related data (36) such that the workpiece is systematically manufactured too large, but will reach correct dimensioning after cooling and temperature equalization.

2. The method according to claim 1, further including:
    (c) manufacturing dynamic data (35) which reflect the course of manufacturing over time are determined in accordance with workpiece data (33) which describe the workpiece to be produced, characteristic data (32) for cladding welding and further parameters, and
    (d) the temperature-related data (36) are determined in accordance with the workpiece data (33), the characteristic data (32) and the manufacturing dynamics data (35).

3. The method according to claim 2, wherein in step (b)
    (b1) modified workpiece data (33') are generated in accordance with the temperature-related data (36), and the work data (34) are generated in accordance with the modified workpiece data (33') and in accordance with the other data, and/or
    (b2) the work data (34'), which have been generated on the basis of the workpiece data (33) and the characteristic data, are modified in accordance with the temperature-related data (36).

4. The method according to claim 3, wherein in step (d) a plurality of sets of temperature-related data (36) reflecting a plurality of different manufacturing dynamics are determined, wherein the plurality of sets are stored and/or used in step (b1) to generate a plurality of sets of modified workpiece data (33') which are stored and/or used in step (c) to generate a plurality of sets of modified work data (34') which are stored.

5. The method according to claim 2, comprising the step (e) of verifying the temperature related data (36) determined in step (d), and, if critical values are found thereby, modifying (31') selectable parameters and therewith returning to step (c) to generate modified manufacturing dynamics data (35) from which modified temperature related data (36') are determined in step (d).

6. A cladding welding method carried out with a cladding welding head in a computer-controlled machine tool to produce a workpiece, comprising the following steps:
    generating work data (34) for cladding welding by a method for producing work data for a cladding welding machine, for producing a workpiece, including: (a) determining temperature-related data (36) which provide information about the temperature of workpiece parts or workpiece regions in a spacially resolved manner, and (b) generating the work data (34) on the basis of the temperature-related data (36) such that the workpiece is systematically manufactured too large, but will reach correct dimensioning after cooling and temperature equalization,
    controlling the machine in accordance with the work data (34),
    during production, measuring of temperatures and workpiece surface positions with spatial resolution,
    checking the measured values, and
    modifying one or more of the following working parameters according to the result of the verification:
        a feed speed relative between build-up welding head and workpiece,
        a welding heating capacity,
        a material feed rate,
        a material feed speed,
        laser focusing.

7. The method according to claim 6, wherein the temperature is measured at the instantaneous cladding welding location and brought to a desired size or range.

8. The method according to claim 6, in which the temporal progress of the production and/or temperature data of the previously manufactured workpiece are compared with corresponding nominal values and/or nominal value ranges, wherein, if deviations are detected, modified work data are generated for further workpiece manufacturing.

9. The method according to claim 7, in which the temporal progress of the production and/or temperature data of the previously manufactured workpiece are compared with corresponding nominal values and/or nominal value ranges, wherein, if deviations are detected, modified work data are generated for further workpiece manufacturing.

10. The method according to one of claim 6, wherein alternating laser deposition welding and material-removing machining are carried out without changing the fixture of the workpiece by exchanging the deposition welding head and a material-removing tool against each other in the machine tool.

11. The method according to one of claim 7, wherein alternating laser deposition welding and material-removing machining are carried out without changing the fixture of the workpiece by exchanging the deposition welding head and a material-removing tool against each other in the machine tool.

12. The method according to one of claim 8, wherein alternating laser deposition welding and material-removing machining are carried out without changing the fixture of the workpiece by exchanging the deposition welding head and a material-removing tool against each other in the machine tool.

\* \* \* \* \*